United States Patent [19]

Boissevain

[11] Patent Number: 4,685,389

[45] Date of Patent: Aug. 11, 1987

[54] HOT AIR CALENDER ROLL CONTROLLER

[75] Inventor: Mathew G. Boissevain, Cupertino, Calif.

[73] Assignee: Measurex Corporation, Cupertino, Calif.

[21] Appl. No.: 695,438

[22] Filed: Jan. 28, 1985

Related U.S. Application Data

[63] Continuation-in-part of Ser. No. 694,855, Jan. 25, 1985.

[51] Int. Cl.⁴ .................... B30B 15/34; B30B 15/04
[52] U.S. Cl. ............................ 100/93 RP; 100/47; 100/162 B; 100/170; 29/113 AD; 219/10.71
[58] Field of Search ............ 100/38, 47, 93 R, 917, 100/162 B, 170; 219/10.41, 10.43, 10.57, 10.61 R, 10.71, 10.73; 34/48, 54; 165/2; 29/116 AD, 113 AD

[56] References Cited

U.S. PATENT DOCUMENTS

| | | | |
|---|---|---|---|
| 2,609,477 | 9/1952 | Borda et al. ............... | 219/370 X |
| 2,981,175 | 4/1961 | Goyette . | |
| 3,094,606 | 6/1963 | Ferris ........................ | 219/370 X |
| 3,177,799 | 4/1965 | Justus et al. . | |
| 3,203,678 | 8/1965 | Sawyer et al. . | |
| 3,668,370 | 6/1972 | Pattison ..................... | 219/370 X |
| 3,702,912 | 11/1972 | Greenberger . | |
| 3,770,578 | 11/1973 | Spurrell . | |
| 4,114,528 | 9/1978 | Walker . | |
| 4,384,514 | 5/1983 | Larive et al. . | |
| 4,425,489 | 1/1984 | Pav et al. . | |
| 4,573,402 | 3/1986 | Sharma et al. ............. | 100/38 |

FOREIGN PATENT DOCUMENTS 211003 10/1957 Australia .................. 100/93 RP

OTHER PUBLICATIONS

Pulp & Paper Magazine Nov. 1984, pp. 54–55.
Pulp & Paper Magazine Dec. 1984 p. 157.

Primary Examiner—Peter Feldman
Attorney, Agent, or Firm—Spensley Horn Jubas & Lubitz

[57] ABSTRACT

A device for controlling the diameter of cylindrical sections of a rotating calender roll. The device comprises at least one nozzle which directs a jet of air against the calender roll. The flow of air from each nozzle remains approximately constant. Only the temperature of the jets change as heating elements associated with each nozzle are energized or deenergized. Thermal expansion or contraction, resulting from localized heating or cooling by the air jets, corrects local non-uniformities in the calender roll diameter.

7 Claims, 6 Drawing Figures

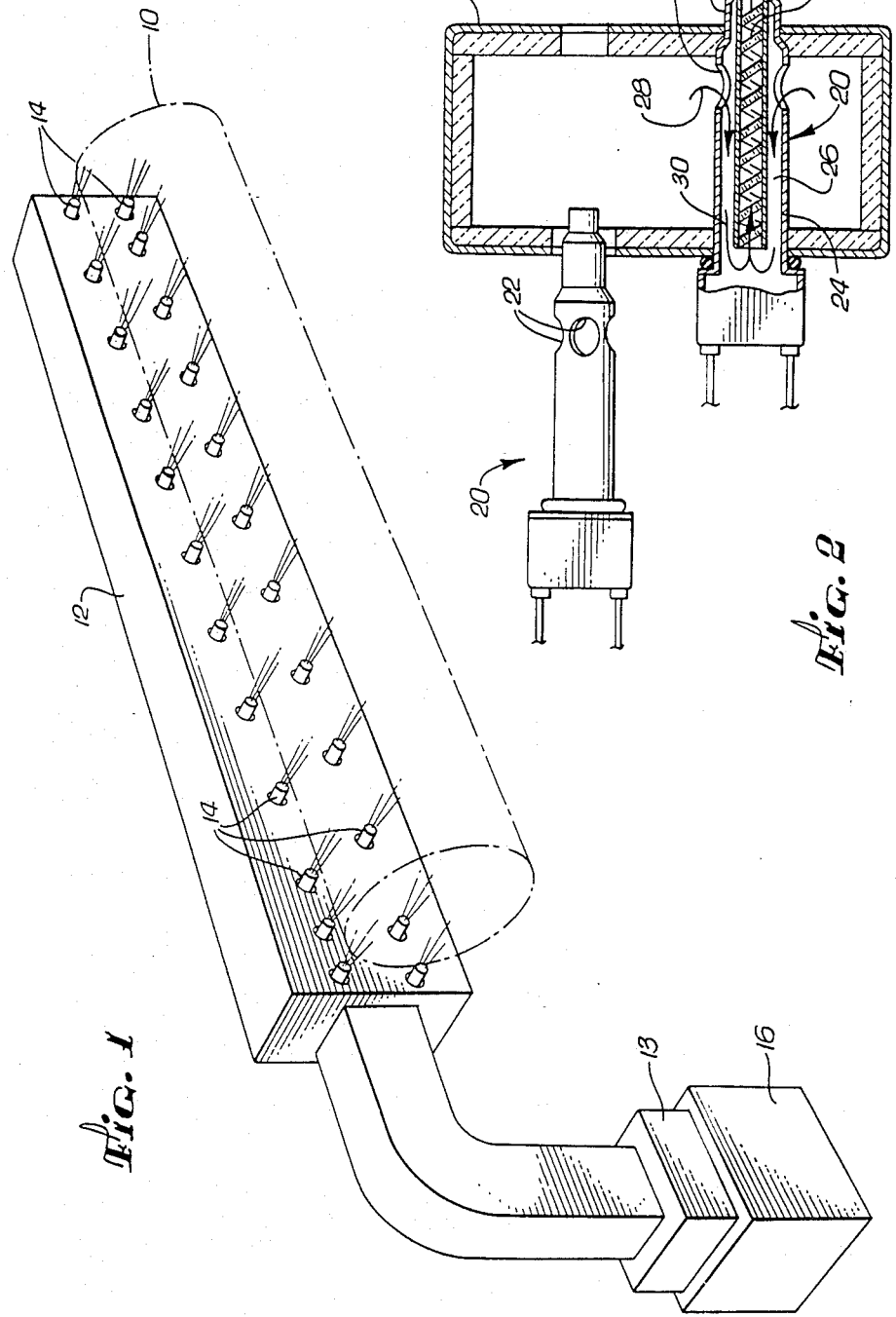

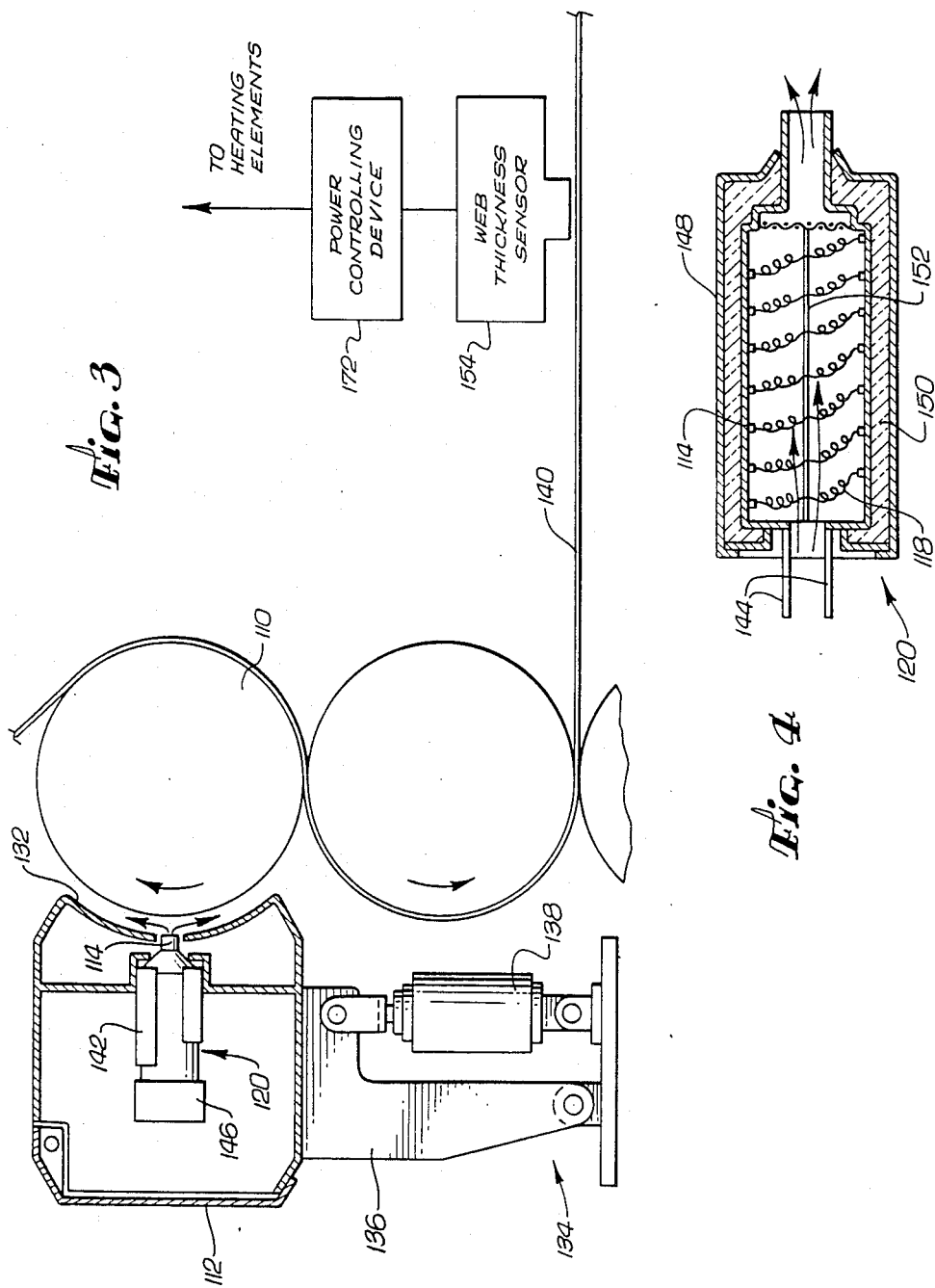

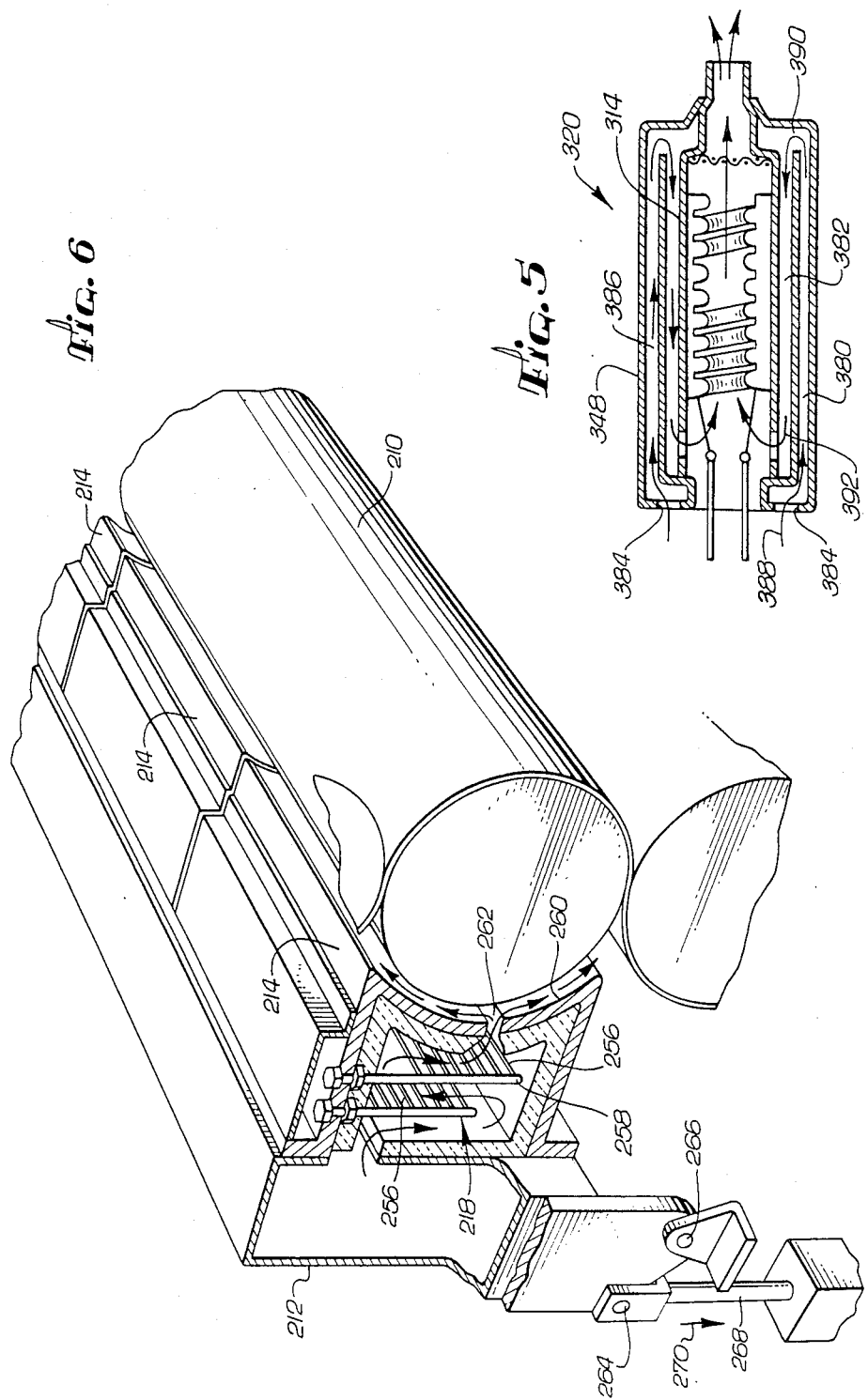

HOT AIR CALENDER ROLL CONTROLLER

BACKGROUND OF THE INVENTION

This application is a continuation-in-part application of pending prior application Ser. No. 694,855, filed Jan. 25, 1985 of Mathew G. Boissevain for "Hot Air Calendar Roll Controller".

The present invention relates to the field of calenders, and more particularly to devices for controlling the diameter of the rolls used in calenders or analagous machines.

Pressing a material between two calender rolls can change the physical characteristics of the material. For example, calendering paper changes its density, thickness and surface features. Thus, the calendering process is frequently used to manufacture paper and other sheet materials.

A common problem associated with calendering is the uneven thickness of the calendered material, or "web". Localized variations in a variety of parameters, including, the diameter of individual calender rolls, creates variations in the spacing or "nip" formed between cooperating rolls. Variations in the nip across the width of a pair of calender rolls produces a web having non-uniform thickness. Therefore, a more uniform thickness can be attained by controlling the local diameter of the rolls.

If the rolls are made of a material that responds to changes in temperature by changing at least one dimension, one may control local roll diameters by varying the temperature of selected cylindrical sections of the calender roll. Previous devices have used this principle by directing jets of hot or cold air against sections of a rotating calender roll to control its local diameters.

Many of these devices blow jets of hot air from a supply plenum against selected sections of the calender roll to increase its local diameter and thus decrease the local thickness of the web. Alternatively, when these devices blow jets of cold air from a separate supply plenum against selected cylindrical sections of the calender roll, the adjacent sections contract. This decreases the local roll diameter and increases the local thickness of the web.

Nozzles communicating with the interior of each plenum direct these jets of air against the calender roll. The nozzles are disposed at intervals corresponding to adjacent sections of the calender roll whose local diameter is to be controlled. Examples of such devices are shown in U.S. Pat. No. 2,981,175 to Goyette, U.S. Pat. No. 3,177,799 to Justice and U.S. Pat. No. 3,770,578 to Spurrell.

Valves have often been used to control the flow of air through each nozzle. Where separate plenums provide the hot air and cold air, many such devices require two valves and two nozzles to control the diameter of each section of the calender roll. Alternatively, a dual control mechanism may be used to mix the relative volumes of hot and cold air from the two plenums and then release the air through a single nozzle. In either configuration, this redundancy can increase the cost of of these devices.

Another problem experienced with controllers of this type is that accurate control of the roll diameter can require precise metering of the air jets. Therefore, the valve control mechanisms generally should not exhibit hysteresis effects so that they can obtain repeatable settings regardless of whether the valve is being opened or closed. Furthermore, these control mechanisms usually must be capable of operating at high or low temperatures. However, even when the valves work properly and the control mechanisms accurately control the size of the valve orifices, the rate that air is released through the nozzles is often variable because the air pressure in each plenum depends upon both the number of valves open at one time and the volume of air released through each nozzle. Thus, the flow of air through the nozzles in these devices can be difficult to control.

These devices are also subject to other limitations and inefficiencies. For example, the nip control range is a function of the maximum and minimum temperatures of the air jets. However, the hot air in the plenum is typically heated by waste steam from the facility power plant. Steam supplied by such a power plant usually has a maximum temperature of about 350° F., and inefficiencies in the heat exchange process further limit the maximum temperature of such steam heated air to about 325° F.

Furthermore, to maintain the air temperature at 325° F., hot air must be continuously supplied to the hot air plenum, even when hot air is not being released through the nozzles. If hot air is not continuously supplied to the hot air plenum, the stagnant air in the plenum may cool to ambient temperature. Then, when a jet of hot air is required to increase the diameter of a section of the calender roll, the cooled stagnant air must first be purged from the plenum. This increases the response time of the device.

The calender roll control device of the present invention has a number of features which overcome many of the disadvantages of calender roll control devices heretofore known. It can provide a constant flow of air from a single plenum and it can accurately adjust the temperature of a plurality of air jets. Since it requires only one plenum and can operate without flow control mechanisms, the device has a relatively low initial cost. Additionally, it does not require steam heating equipment. Instead, the device heats the air jets only where and when necessary to increase the roll diameter. Furthermore, because it produces hotter air jets than are typically provided by steam powered equipment, the device of the present invention can provide approximately two to five times the nip control range on typical 12" to 24" diameter 190° F. calender roll. These and other advantages will become apparent in the description which follows.

SUMMARY OF THE INVENTION

The present invention is directed to controllers for controlling local calender roll diameters by directing jets of hot or cold air against selected cylindrical sections of a rotating calender roll. The roll is made of a material that responds in at least one dimension to changes in temperature. Thermal expansion or contraction, resulting from localized heating or cooling by the air jets, corrects local nonuniformities in the calender roll diameter.

In the illustrated embodiments, the invention comprises a single elongated cold air plenum positioned alongside a calender roll. A plurality of nozzles, disposed along the length of the plenum, direct jets of air at cylindrical sections of the roll. Heating elements, such as electrical resistive heaters, are positioned within or adjacent each nozzle. Therefore, when the heating elements are energized, the cold air escaping through the nozzles is heated by contact with the heating elements. It is recognized, however, that other types of heating devices may be used.

A sensor measures the thickness of the web at a plurality of locations along the width of the web and power to the heating elements is adjusted to maintain a uniform thickness. The volume of air emitted by each nozzle can remain substantially constant. Only the temperature of the air jets need change as the heating elements are energized or de-energized in response to signals from the web thickness sensor.

BRIEF DESCRIPTION OF THE DRAWINGS

FIG. 1 is a perspective view of one embodiment of the present invention showing a plurality of nozzles disposed along the length of the plenum and directing air against a calender roll.

FIG. 2 is a cross-sectional view of the embodiment illustrated in FIG. 1 showing removable heating modules.

FIG. 3 illustrates another embodiment of the present invention having a single row of nozzles directed against a calender roll and a shroud for preventing cold air entrainment. This embodiment is supported by an over-center support mechanism.

FIG. 4 is a detailed illustration of a heating module usable with the embodiment of FIG. 3.

FIG. 5 is a detailed illustration of another type of heating module usable with the embodiment of FIG. 3.

FIG. 6 is a cross-sectional plan view of another preferred embodiment of the present invention having a concave nozzle to prevent cold air entrainment.

Like reference numbers in the various figures refer to like elements.

DETAILED DESCRIPTION OF THE PREFERRED EMBODIMENTS

In one embodiment of the present invention, illustrated in FIG. 1, the calender roll control apparatus extends alongside a roll 10 of the calendering device. The apparatus comprises a cold air plenum 12 and a plurality of nozzles 14 dispersed along the length of the plenum 12 and communicating with its interior. A fan 13 pressurizes the plenum 12 with air. This pressurized air may be optionally preheated or cooled by any of a variety of well known devices 16 for heating or cooling air. The pressurized air in the plenum 12 escapes through the nozzles 14 which direct the air against sections of the calender roll 10 to control its diameter. An additional row of nozzles 14 is disposed near the ends of the plenum 12 to compensate for the increased tendency of the calender roll 10 to cool at its ends.

FIG. 2 is a more detailed cross-sectional view of the device illustrated in FIG. 1. At least one electrical heating element 18 is disposed within every nozzle 14 and each nozzle 14, with its internal heating element 18, comprise a unitary heating module 20. As shown in FIG. 2, these modules 20 are detachable from the plenum 12 for convenient repair, inspection or replacement. In FIG. 2, the upper heating module is shown detached from the plenum 12.

Air from the plenum 12 enters the heating module 20 through holes 22 in the module casing 24 provided for this purpose. The air then flows through a channel 26 toward the rear of the heating module 20 where it enters the interior of the nozzle 14. Arrows 28, 30 illustrate the flow path of the air. Air passing through the nozzle 14 contacts the heating elements 18. Therefore, although cold air in the plenum 12 escapes at a constant rate through each nozzle 14, the temperature of the escaping air can be elevated by energizing the heating elements 18.

FIG. 3 illustrates a second embodiment of the present invention. It operates in substantially the same manner as the first embodiment. However, in this embodiment, pressurized air from the plenum 112 enters the rear of the heating module 120 and flows directly through the nozzle 114 toward the calender roll 110. Additionally, the nozzles 114 protrude from a concave shroud 132 which acts to constrain the air emitted by the nozzles 114 so that the air remains in contact with the calender roll 110, thus enhancing the efficiency of heat transfer to or from the roll 110. The shroud 132 also prevents cold ambient air from being entrained by the air jets. This would reduce the effective temperature of the jets. Of course, a similar shroud 132 could be used with the embodiment of the invention illustrated in FIG. 1 and FIG. 2.

The cross-sectional view shown in FIG. 3 illustrates the nozzles 114 aligned lengthwise along the center of the plenum 112. The nozzles 114 may, of course, be positioned above or below the center line of the plenum 112. However, centrally positioned nozzles 114 generally enhance the efficiency of heat transfer between the jets of air and the calender roll 110 by providing an equally long flow path for air travelling between the calender roll 110 and the shroud 132, whether this air emerges at the top or bottom of the shroud 132. Additionally, extra rows of nozzles 114 may be provided at the ends of the calender roll 110 above and/or below the center line of the plenum 112 to compensate for the increased tendency of the calender roll 110 to cool at its ends.

The calender roll control device of FIG. 3, is shown supported by an over-center support mechanism 134. This mechanism comprises two rigid pivotable arms 136. The arms 136 are disposed at either end of the plenum 112. These arms 136 support the plenum 112 so that the plenum 112 and shroud 132 are pivotable toward or away from the calender roll 110.

An extendible air cylinder 138 is associated with each pivotable arm 136. Pressurizing the cylinders 138 with air causes them to expand, thus rocking the plenum 112 away from the calender roll 110. In the operating position, however, each air cylinder 138 is pressurized so that the nozzle 114 and shroud 132 are positioned approximately ½ inch to approximately 2 inches from the surface of the calender roll 110 depending upon the application and the calender roll control device leans slightly toward the calender roll 110. In this metastable position, if the web 140 breaks and wraps around the roll 110, a slight forceful contact between the web 140 and the nozzles 114 or shroud 132 will be sufficient to rock the device back away from the calender roll 110 and thus avoid damage to the device.

FIG. 4 is a detailed view of a heating module 120 which is usable with the embodiment of the present invention illustrated in FIG. 3. This heating module 120 fits into the heating module socket 142 shown in FIG. 3. Two conducting elements 144 extend from the rear of the heating module 120 and plug into an electrical socket 146 positioned within the plenum 112. The module 120 may also be easily unplugged for convenient inspection, repair or replacement.

The module comprises a nozzle 114 which tapers toward the front. This nozzle 114 is surrounded by a larger concentric outer tube 148. The space between the nozzle 114 and the outer tube 148 is filled with an insulating material 150.

The heating elements 118 are suspended on a thin mica frame 152 which has a low thermal mass. The low thermal mass of the heating elements 118 and mica frame 152 allow the temperature of the air jets to change rapidly in response to signals from the web thickness sensor 154.

FIG. 5 is a detailed illustration of another type of heating module 320, which is also usable with the embodiment of FIG. 3. This heating module 320 is similar in construction and operation to the heating module 120 of FIG. 4. However, it does not use the insulating material 150 associated with the module 120 of FIG. 4. Instead, this embodiment uses two approximately concentric annular air channels or conduit 380, 382 to insulate the cold air in the plenum 112 from the heated air inside the heating modules 320.

In operation, pressurized air from the plenum 112 enters holes 384 in the rear of the module 312. This air flows along the outer channel 380 toward the front of the heating module 320. The outer channel 380 is formed between the outer tube 348 and an intermediate cylindrical member 386 positioned between the outer tube 348 and the nozzles 314. When this air flow reaches the front of the heating module 320, it changes direction and flows back toward the rear of the heating module 320 along the inner channel 382 formed between the intermediate cylindrical member 386 and the nozzle 314. Once the air flow reaches the rear of the heating module 320, it enters the nozzle 314 where it again changes direction, heading out toward the calender roll 310 and past the heating elements 318. This serpentine channeling system, illustrated by arrows 388, 390 and 392 in FIG. 5, generally provides better insulation between the cold air in the plenum 312 and the heated air inside the nozzle 314 than the simple layer of insulating material 150 shown in FIG. 4.

FIG. 6 illustrates a third embodiment of the present invention. In this embodiment, pressurized air from the plenum 212 enters the rear of the nozzle 214 and flows through the nozzle 214 toward the calender roll 210. As in the first and second embodiments, each nozzle 214 contains internal heating elements 218 which may be used to heat the air as it flows through the nozzle 214. The heating elements 218 comprise lengths of resistive wire 256 strung between conductive posts 258 which are disposed at opposite ends of the nozzle 214. Each nozzle 214 is 10 inches long, however, the nozzles 214 may be longer or shorter depending upon the desired degree of nip control.

These nozzles 214 have concave ends 260 which conform to the surface of the calender roll 210. The concave nozzles 214 in this embodiment serve functions similar to the shroud 132 (see FIG. 3) in the second embodiment of the present invention. The concave ends 260 of the nozzle 214 constrain the air emitted from the nozzle orifice 262 so that it remains in contact with the calender roll 210 until the air emerges at the edge of the nozzle 214. Since the hot or cold air emitted from the orifice 262 remains in contact with the calender roll 210 for a longer period of time, more heat is transferred between the roll 210 and the air. Additionally, the concave nozzles 214 prevent cold ambient air from being entrained by the air jets. As previously mentioned, this would reduce the effective temperature of the jets.

The plenum 212 is pivotally mounted on pivots 264, 266. Pivot 264 is supported by an elongated member 268. When the member 268 retracts in the direction of the arrow 270, the plenum 212, nozzles 214, and heating elements 218 swing away from the calender roll 210. This permits convenient repair, inspection or replacement of the device.

Each embodiment of the present invention operates in substantially the same manner. Therefore, the operation of the device of the present invention will be described with reference to only the second embodiment illustrated in FIG. 3 and FIG. 4. However, the description which follows is also applicable to the other embodiments.

During operation of the invention, a sensor 154 measures the thickness of the web 140 and produces a signal corresponding to the measured thickness of each section of web 140. These signals are then fed to a power controlling device 172 which adjusts the power to the heating elements 118 to obtain a web 140 having uniform thickness. An example of a sensor controlled calender roll control device is shown in U.S. Pat. No. 4,114,528 to Walker.

Depending upon the degree of deviation of the web 140 from the desired thickness, more or less power is applied to the heating elements 118 in the nozzles 114 adjacent those sections of the calender roll 110 whose diameters are to be adjusted. The sections of the calender roll 110 producing too thick a web 140 are heated by energizing the heating elements 118 in an adjacent nozzle 114. The greater the amount of power applied to the heating elements 118, the more hot air impinges against the calender roll 110 and the more thermal expansion occurs. For example, with 1 psig plenum pressure and a 0.625 inch nozzle diameter, a 5.5 Kw heating element 118 will heat 65° F. air to 600° F. in about six seconds.

Alternatively, when the sensing device 154 detects a thin web section 140 the power controlling device 172 directs less power to the adjacent heating elements 118 or it turns these heating elements 118 completely off. As the power to the heating elements is decreased, the adjacent sections of calender roll 110 are subjected to a flow of colder air. The colder air causes the adjacent sections of the calender roll 110 to contract, thereby increasing the local nip spacing and producing a thicker section of web.

Many steam heated apparatuses for controlling the thickness of the calendered web 140 are limited to heating air to a maximum temperature of about 325° F. In contrast, the present invention can achieve air temperatures of 600° F. This higher temperature provides more than twice the control range on a typical 190° F., 12-inch roll 110. Additionally, since the air flow through every nozzle 114 remains constant, more accurate control is possible. The temperature of the air emerging from each nozzle 114 is independent of the temperature of the air emerging from the other nozzles 114.

Two preferred embodiments of the present invention have been described. Nevertheless, it is understood that one may make various modifications without departing from the spirit and scope of the invention. For example, instead of continuously varying the level of power to the heating elements, the power may be switched on and off for varying percentages of a duty cycle. Furthermore, nozzles of different shapes and sizes are not beyond the scope of the present invention. Thus, the invention is not limited to the preferred embodiments described herein.

I claim:

1. In a calender roll control apparatus of a type having a plurality of nozzles for directing flows of air toward a calender roll to control the diameter of the calender roll and thereby control the thickness of a sheet of calendered material, the improvement comprising:
a plurality of individually controllable heating elements, each heating element being associated with one of the nozzles for selectively heating the flow of air through the associated nozzle, wherein the nozzles are positioned at fixed intervals in a row lengthwise along the calender roll and additional nozzles are positioned near the ends of the calender roll, each of the additional nozzles having associated therewith an additional controllable heating element for selectively heating the flow of air through the additional nozzles.

2. In a calender roll control apparatus of a type having a plurality of nozzles for directing flows of air from a common plenum toward a calender roll to control the diameter of the calender roll and thereby control the thickness of a sheet of calendered material, the improvement comprising:
a plurality of tubes, each tube being disposed at least partially within the plenum and forming one of said nozzles;
a plurality of heating elements, each heating element being disposed inside one of the tubes so that the heating elements can heat the flow of air through the tubes; and
conduit means for guiding a flow of air over the outer surface of each tube to insulate the air in the plenum from the heating element and air inside each of the tubes, so that the heat from said heating elements will not heat the air in the plenum before the air in the plenum enters the tubes.

3. A calendar roll control apparatus as in claim 1, wherein the additional nozzles are disposed on either side of the line of the lengthwise row of nozzles.

4. A calender roll control apparatus as in claim 2, wherein the conduit means comprises at least one approximately coaxial generally cylindrical member surrounding each tube and forming a channel between each surrounded tube and each cylindrical member for guiding the flow of air from the plenum over the outer surface of each tube.

5. A calender roll control apparatus as in claim 2, wherein the conduit means defines an inner channel surrounding each tube and an outer channel surrounding each inner channel.

6. A calender roll control apparatus as in claim 2, wherein the conduit means comprises inner and outer members surrounding each tube and forming an inner air guiding channel between each tube and each inner member and an adjacent outer air guiding channel between each inner member and each outer member, both inner and outer channels being in flow communication with the interior of each surrounded tube.

7. In a calender roll control apparatus of a type having a plurality of nozzles for directing flows of air from a plenum toward a calender roll to control the diameter of the calender roll and thereby control the thickness of a sheet of calendered material, the improvement comprising:
a plurality of heating elements, each heating element being inside one of the nozzles for heating the flow of air through the nozzles; and
conduit means for circulating air around each of the nozzles to insulate the air in the plenum from the heating element and iar inside each of the nozzles, wherein the conduit means includes inner and outer approximately coaxial generally cylindrical members surrounding each nozzle and forming an inner channel between the nozzle and the inner member and an adjacent outer channel between the inner member and the outer member, the inner member having an aperture toward the front of the nozzle to admit a flow of air from the outer channel and the nozzle having an aperture near the rear of the nozzle to admit a flow of air from the inner channel, so that the direction of air flow alternates between the outer channel and the inner channel and between the inner channel and the inside of the nozzle.

* * * * *